(12) United States Patent
Ross

(10) Patent No.: US 9,713,917 B2
(45) Date of Patent: Jul. 25, 2017

(54) ADHESIVE APPLICATION IN ROTORCRAFT CONNECTION JOINTS

(71) Applicant: Bell Helicopter Textron Inc., Fort Worth, TX (US)

(72) Inventor: Brent C. Ross, Flower Mound, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 422 days.

(21) Appl. No.: 14/284,056

(22) Filed: May 21, 2014

(65) Prior Publication Data

US 2015/0336368 A1 Nov. 26, 2015

(51) Int. Cl.
| | | |
|---|---|---|
| *B32B 37/14* | (2006.01) | |
| *B32B 37/12* | (2006.01) | |
| *F16B 11/00* | (2006.01) | |
| *B29L 31/30* | (2006.01) | |
| *B29C 65/48* | (2006.01) | |
| *B29C 65/50* | (2006.01) | |
| *B29C 65/52* | (2006.01) | |

(Continued)

(52) U.S. Cl.
CPC ........ *B32B 37/142* (2013.01); *B32B 37/1284* (2013.01); *F16B 11/008* (2013.01); *B29C 65/4835* (2013.01); *B29C 65/5071* (2013.01); *B29C 65/5085* (2013.01); *B29C 65/52* (2013.01); *B29C 65/562* (2013.01); *B29C 65/72* (2013.01); *B29C 65/7826* (2013.01); *B29C 66/004* (2013.01); *B29C 66/12441* (2013.01); *B29C 66/322* (2013.01); *B29C 66/43441* (2013.01); *B29C 66/474* (2013.01); *B29C 66/721* (2013.01); *B29C 66/7254* (2013.01); *B29L 2031/3082* (2013.01); *B29L 2031/3088* (2013.01); *Y10T 156/1057* (2015.01)

(58) Field of Classification Search
CPC .......... B29C 66/12441; B29C 66/5432; B29C 66/545; B32B 37/1284; B32B 37/142; B65B 7/2878; F16B 11/008; Y10T 156/1057

See application file for complete search history.

(56) References Cited

U.S. PATENT DOCUMENTS 5,171,099 A * 12/1992 Westre ...................... F16B 5/01
403/264
7,393,488 B2 7/2008 Grose et al.
(Continued)

FOREIGN PATENT DOCUMENTS

| WO | 2006127372 | 11/2006 |
| WO | 2012091695 | 7/2012 |
| WO | 2012172132 | 12/2012 |

OTHER PUBLICATIONS

European Search Report issued in European Application No. 14175969.6 on Dec. 2, 2014; 3 pages.

(Continued)

*Primary Examiner* — Mark A Osele
*Assistant Examiner* — Christopher C Caillouet

(57) ABSTRACT

A method for applying adhesive to sides of a flange, such as in rotorcraft connection joints, includes attaching an intermediate member to an edge of a flange and flowing adhesive in gaps between sides of the flange and inner edges of a double lap joint element by inserting the flange with the intermediate member into the double lap joint element.

21 Claims, 9 Drawing Sheets

(51) Int. Cl.
*B29C 65/56* (2006.01)
*B29C 65/72* (2006.01)
*B29C 65/78* (2006.01)
*B29C 65/00* (2006.01)

(56) References Cited

U.S. PATENT DOCUMENTS

| | | |
|---|---|---|
| 7,541,083 B2 | 6/2009 | Grose et al. |
| 7,625,623 B2 | 12/2009 | Grose et al. |
| 2004/0011927 A1* | 1/2004 | Christman .............. B29C 65/00 244/131 |
| 2007/0270029 A1* | 11/2007 | Schroeder .............. B62D 21/08 439/517 |

OTHER PUBLICATIONS

Communication pursuant to Article 94(3) issued in EP Application No. 14175969.6 on Jan. 13, 2015, 5 pages.

\* cited by examiner

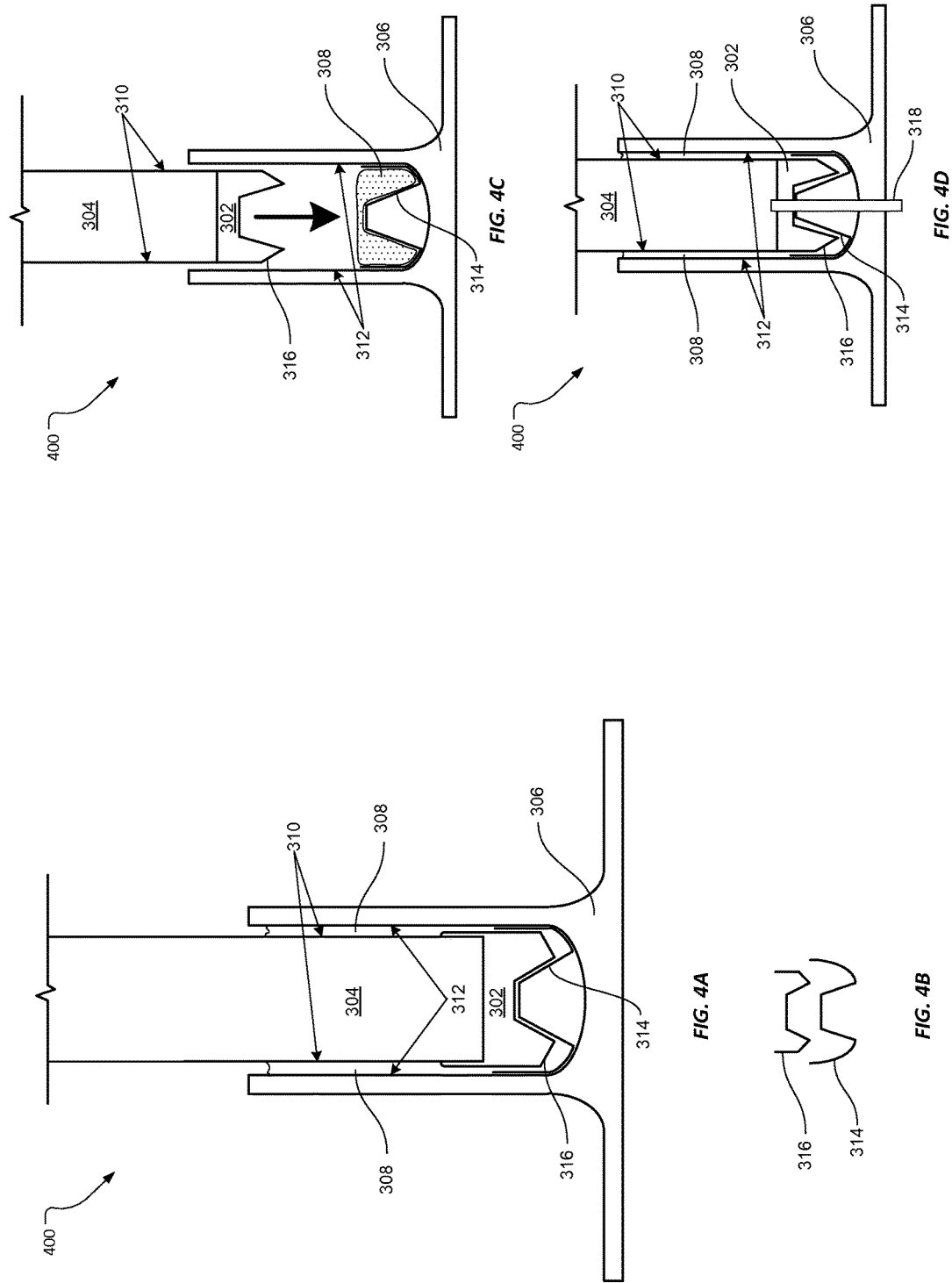

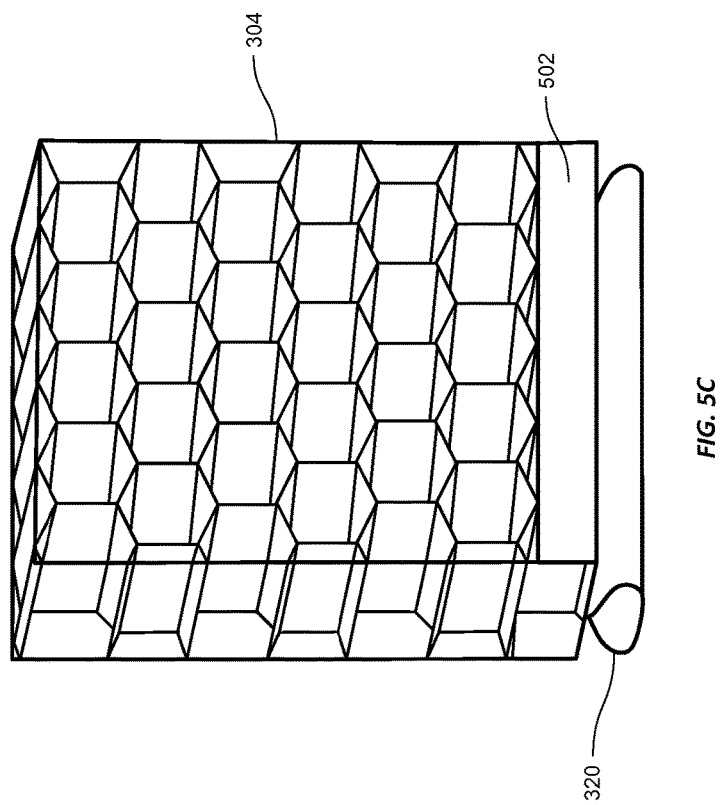
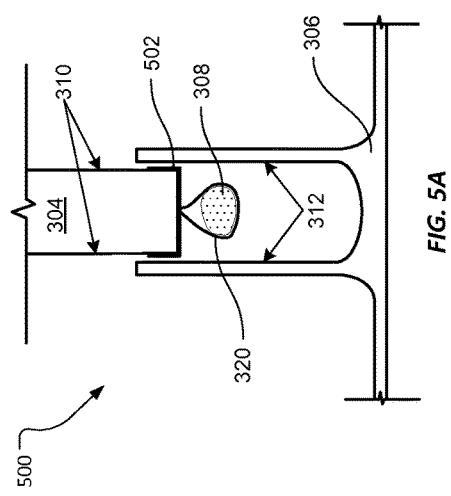
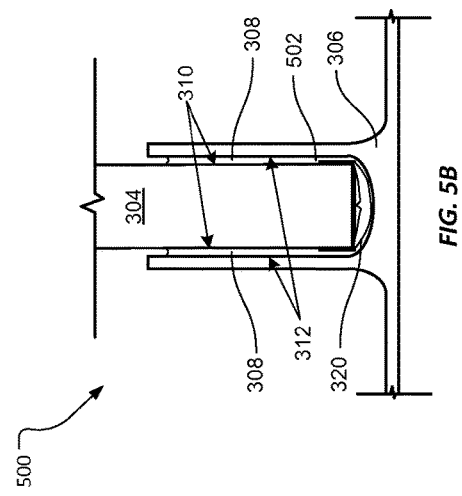

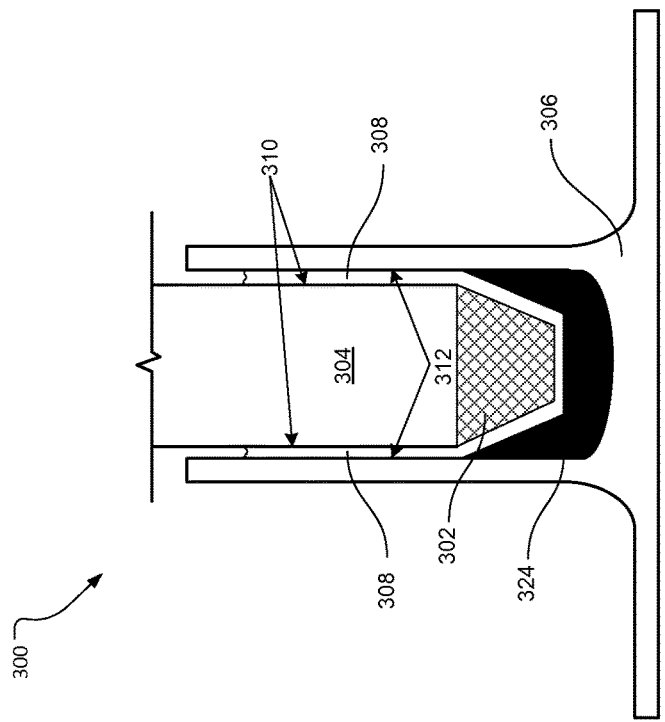
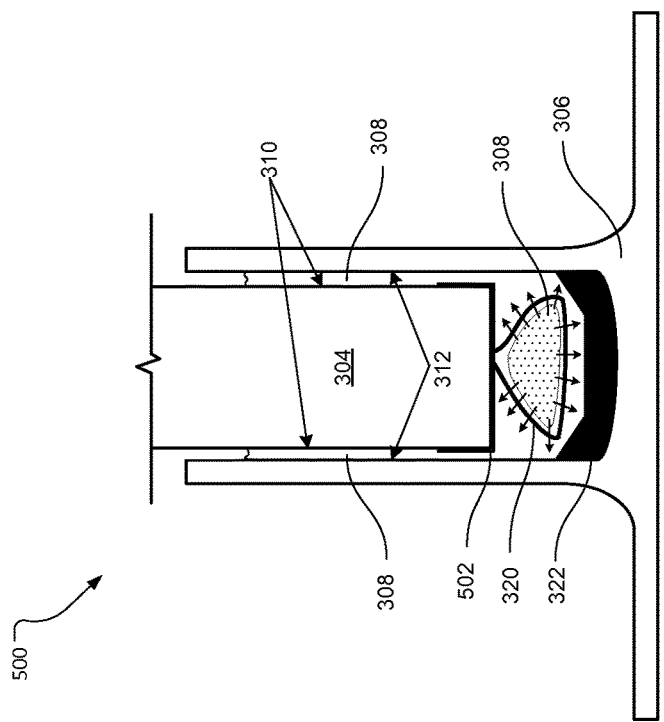

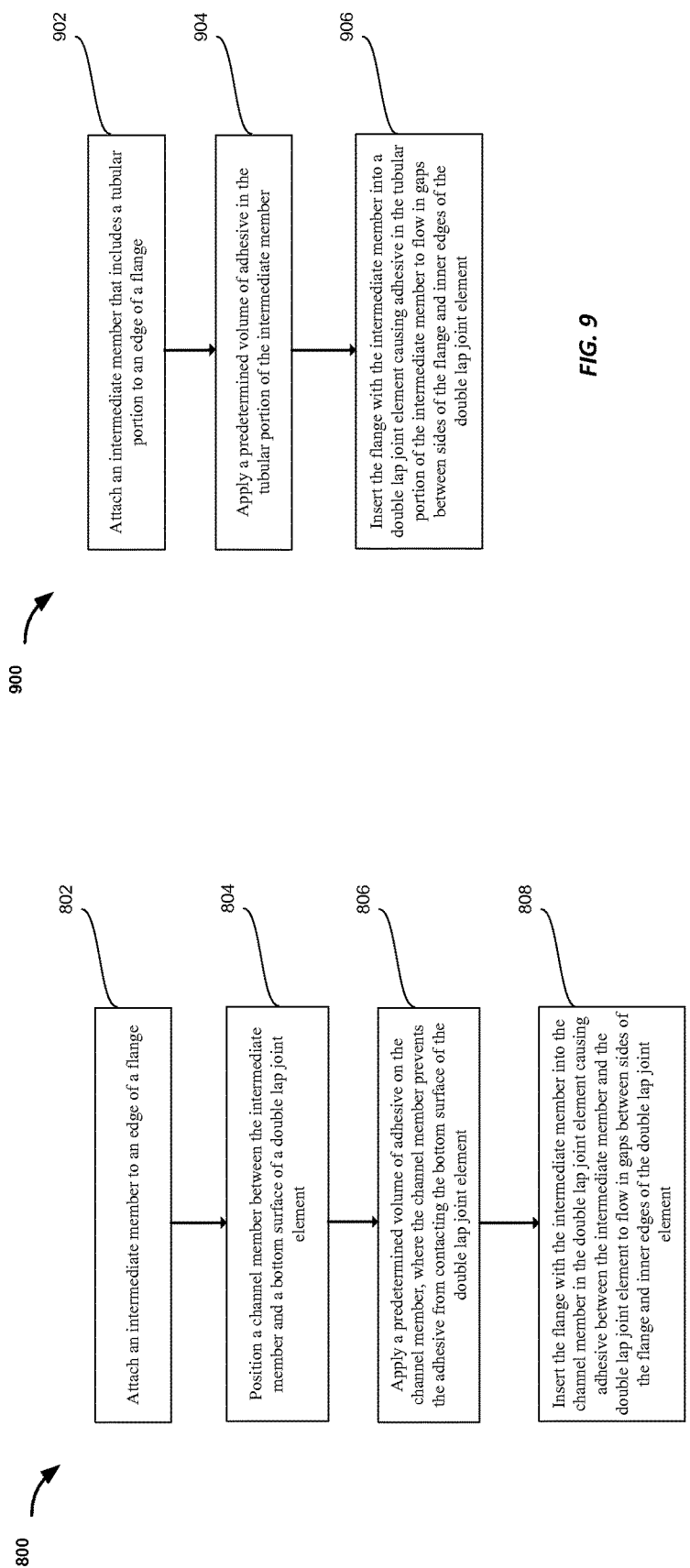

ADHESIVE APPLICATION IN ROTORCRAFT CONNECTION JOINTS

TECHNICAL FIELD

This disclosure relates to adhesive application in connection joints, e.g., connections joints used in rotorcrafts to bond rotorcraft components.

BACKGROUND

Some rotorcraft (or aircraft) surfaces and structures are connected at bond socket joints, or "pi" joints, with adhesive. For example, a fuselage panel of a rotorcraft can connect to a bond socket joint on a rotorcraft airframe with adhesive. A bond socket joint includes two upstanding legs that extend from a base to create a bond socket, or reservoir, between the upstanding legs. Applying adhesive to the bond socket joint is sometimes completed by partially filling the bond socket with adhesive and inserting a panel, or flange, into the bond socket. The panel forces the adhesive in the bond socket to move into gaps between the upstanding legs and the panel, creating an adhesive bond between the upstanding legs and the panel.

SUMMARY

This disclosure describes application of adhesive on a component in a connection joint, for example, on a side or sides of a flange of a rotorcraft component or aircraft component in a bond socket joint.

Certain aspects encompass a method for applying adhesive to sides of a flange. The method includes attaching an intermediate member to an edge of a flange, and flowing adhesive in gaps between sides of the flange and inner edges of a double lap joint element by inserting the flange with the intermediate member into the double lap joint element.

Certain aspects encompass a method for applying adhesive to sides of a flange. The method includes attaching an intermediate member to an edge of a flange, positioning a channel member between the intermediate member and a bottom surface of a double lap joint element, applying a predetermined volume of adhesive on the channel member, and inserting the flange with the intermediate member into the channel member in the double lap joint element causing adhesive between the intermediate member and the double lap joint element to flow in gaps between sides of the flange and inner edges of the double lap joint element. The channel member prevents the adhesive from contacting the bottom surface of the double lap joint element.

Certain aspects encompass a method for applying adhesive to sides of a flange. The method includes attaching an intermediate member that includes a tubular portion to an edge of a flange, applying a predetermined volume of adhesive in the tubular portion of the intermediate member, and inserting the flange with the intermediate member into a double lap joint element causing adhesive in the tubular portion of the intermediate member to flow in gaps between sides of the flange and inner edges of the double lap joint element.

The aspects above can include some, none, or all of the following features. The intermediate member prevents the edge of the flange from contacting the adhesive. Inserting the flange with the intermediate member into the double lap joint element includes lowering the flange with the intermediate member into the double lap joint element, and the edge of the flange is a lower edge of the flange. The method includes positioning, at a bottom surface of the double lap joint element, a channel member having a profile that is substantially similar to a profile of the intermediate member. The channel member is permanently bonded to the bottom surface of the double lap joint element. The channel member is removable from the bottom of the double lap joint element. The method includes applying a predetermined volume of the adhesive on the channel member after positioning the channel member at the bottom of the double lap joint element, wherein the channel member prevents the adhesive from contacting the bottom surface of the double lap joint element. The method includes applying a predetermined volume of the adhesive on the channel member before positioning the channel member at the bottom of the double lap joint element, wherein the channel member prevents the adhesive from contacting the bottom surface of the double lap joint element. The intermediate member comprises a contoured plunger. The method includes tightening a fastener through the double lap joint element and the channel member and connected to the intermediate member to force the intermediate member closer to the bottom surface of the double lap joint element. The intermediate member includes a tubular portion, and the method includes filling the tubular portion of the intermediate member with the adhesive. The method includes causing perforations to be formed in a plurality of perforable positions on a surface of the tubular member of the intermediate member through which the adhesive flows into the gaps between the sides of the flange and the inner edges of the double lap joint element. Causing perforations to be formed in a plurality of perforable positions on a surface of the tubular member includes forcing the intermediate member against a bottom surface of the double lap joint element. The method includes eliminating excess adhesive at a bottom surface of the double lap joint element using a spacer positioned at the bottom surface of the double lap joint element. The method includes positioning, at a bottom surface of the double lap joint element, a channel member before inserting the intermediate member into the double lap joint element. The adhesive includes a predetermined volume of adhesive. The method includes removing excess adhesive from the sides of the flange. Positioning a channel member between the intermediate member and a bottom surface of a double lap joint element includes positioning the channel member at the bottom surface of the double lap joint element. Positioning the channel member at the bottom surface of the double lap joint element includes positioning the channel member after applying a predetermined volume of adhesive on the channel member. The method includes forcing the intermediate member against a bottom surface of the double lap joint element to cause adhesive to flow through a plurality of perforations present in the tubular portion of the intermediate member and into the gaps between the sides of the flange and the inner edges of the double lap joint element.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4D are schematic cross-sectional views of an example adhesive application system.

FIGS. 5A and 5B are schematic cross-sectional views of an example adhesive application system. FIG. 5C is a perspective view of an example intermediate member with a tubular portion attached to a flange.

FIGS. 6A and 6B are schematic cross-sectional views of example adhesive application systems.

FIG. 8 is a flowchart describing a method for applying adhesive to sides of a flange.

FIG. 9 is a flowchart describing a method for applying adhesive to sides of a flange.

Like reference numbers and designations in the various drawings indicate like elements.

DETAILED DESCRIPTION

Figure 1:
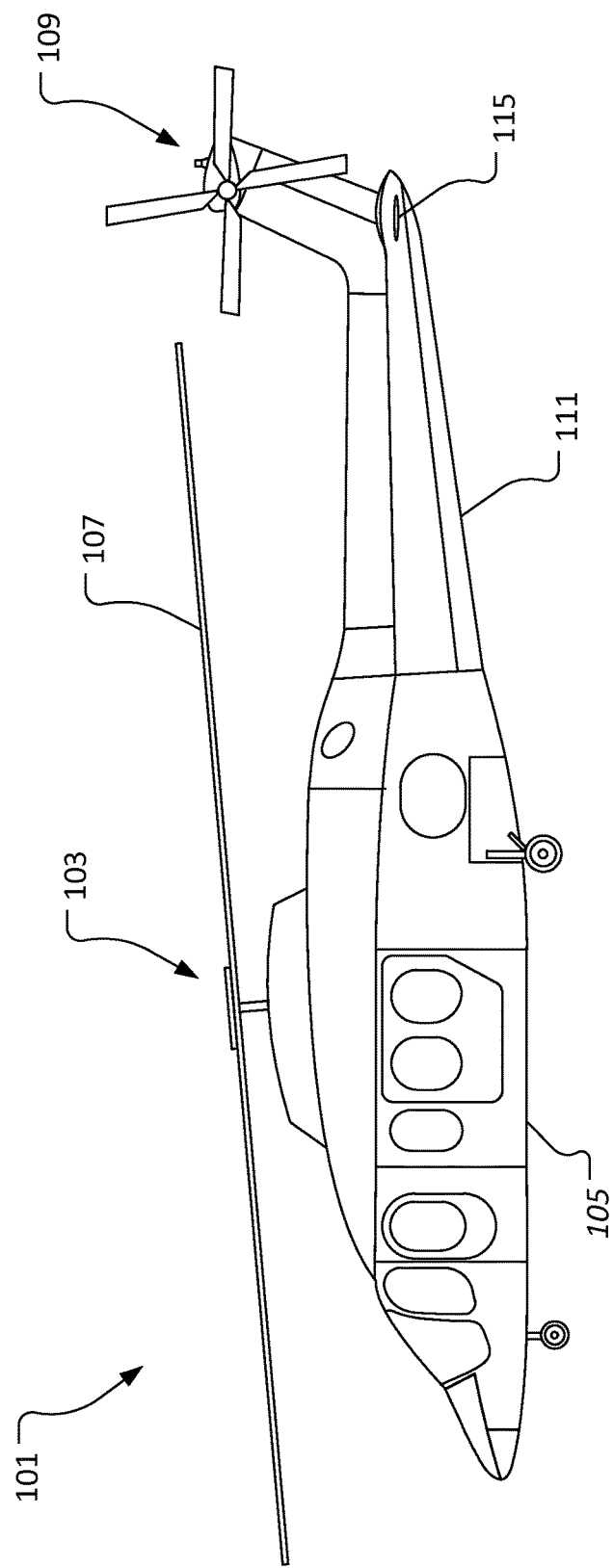
FIG. 1 is a schematic side view of an example helicopter.

This disclosure describes applications of adhesive to bond a rotorcraft component or aircraft component to a joint, for example, by applying adhesive to sides of a flange of a rotorcraft component in a connection joint. A connection joint can include two upstanding legs extending from a base to create a reservoir between the upstanding legs. Example techniques can be applied to any member that has the same or similar shape as a flange and/or any rotorcraft component whose sides need to be coated with adhesive. Some rotorcraft components attach with adhesive to connection joints on the rotorcraft, such as bond socket joints or other double lap joint elements. Rotorcraft components that attach with adhesive to connection joints can include fuselage structures, core board, composite laminate, wall panels, floor panels, floor supports, ceiling panels, ceiling supports, roof beams, ribs and spars of wings and tail surfaces, skin surfaces, keel beams, frames, bulkheads, and/or others. FIG. 1 shows an example helicopter 101 including components that can attach with adhesive to connection joints on the helicopter 101. Similarly, FIG. 2 shows an example tiltrotor aircraft 201 including components that can attach with adhesive to connection joints on the tiltrotor aircraft 201.

Applying adhesive to bond a rotorcraft component to a connection joint includes setting a rotorcraft component into a support joint such that adhesive flows in gaps between sides of the rotorcraft component and inner edges of the connection joint. Sometimes, adhesive is applied to the connection joint, and the rotorcraft component is forced into the connection joint such that the adhesive bonds to inner edges of the connection joint and to sides of the rotorcraft component. As described in this disclosure, an intermediate member attaches to a rotorcraft component, and the rotorcraft component with the intermediate member is inserted into the connection joint. In some implementations, adhesive is applied to the connection joint before the rotorcraft component and intermediate member are inserted into the connection joint. In some implementations, adhesive is applied to the intermediate member before the rotorcraft component and intermediate member are inserted into the connection joint. In some implementations, an intermediate member can allow proper metering of adhesive before the rotorcraft component and intermediate member are inserted into the connection joint, for example, to promote even distribution of adhesive in the connection joint, to reduce excess adhesive use, and to reduce component weight. In some implementations, the intermediate member allows for application of adhesive (metered or otherwise) to the intermediate member instead of the connection joint, for example, to simplify and ease structural assembly and automate application of adhesive. Certain implementations of the intermediate member allow positioning of the rotorcraft component within the connection joint, and allow the application of force to squeeze the adhesive into a bondline area of the connection joint from an exterior skin of the connection joint, which can be repeatable and more accurate than the application of force to the rotorcraft component.

Figure 2:
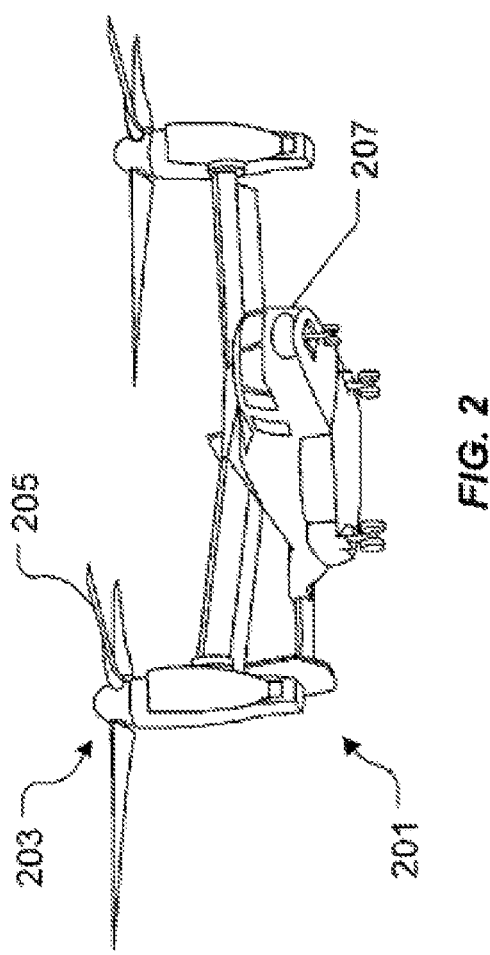
FIG. 2 is a schematic side view of an example tiltrotor aircraft.

FIGS. 1 and 2 are schematic diagrams of two different rotorcrafts. FIG. 1 is a side view of the example helicopter 101, while FIG. 2 is an oblique view of the example tiltrotor aircraft 201. Helicopter 101 includes a rotary system 103 carried by a fuselage 105. Rotor blades 107 connected to the rotary system 103 provide flight for helicopter 101. The rotor blades 107 are controlled by multiple controllers within fuselage 105. The pitch of each rotor blade 107 can be manipulated to selectively control direction, thrust, and lift of the helicopter 101. For example, during flight a pilot can manipulate a cyclic controller for changing the pitch angle of rotor blades 107 and/or manipulate pedals, thus providing vertical, horizontal, and yaw flight movement. Helicopter 101 can further include an anti-torque system 109 and empennages 111 and 115.

Tiltrotor aircraft 201 includes two or more rotary systems 203 having multiple proprotors 205 and carried by rotatable nacelles. The rotatable nacelles allow aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit of fuselage 207, for causing movement of the aircraft.

Figure 3B:
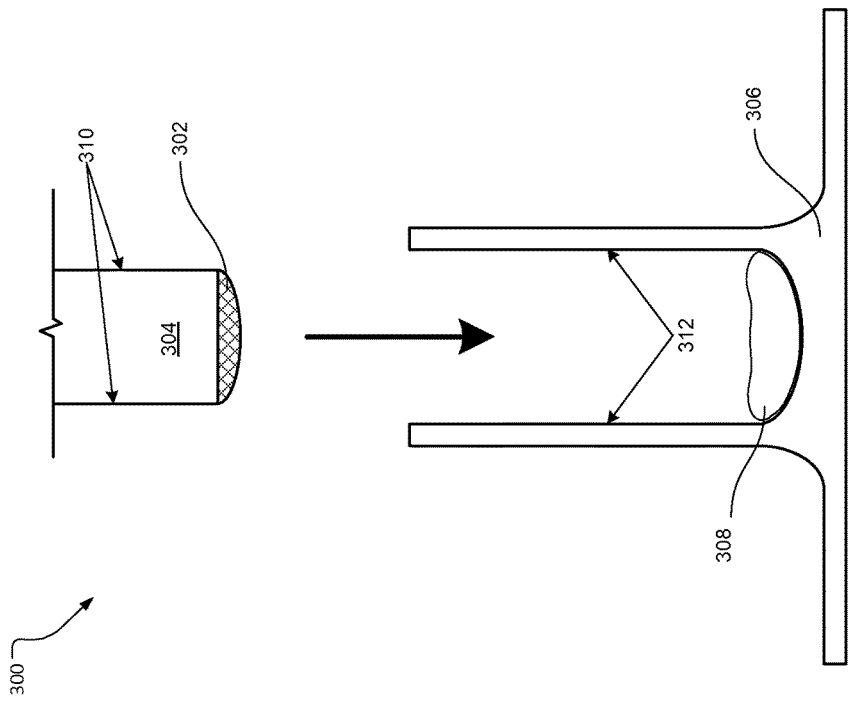
FIGS. 3A-3C are schematic cross-sectional views of an example adhesive application system.
Figure 3A:
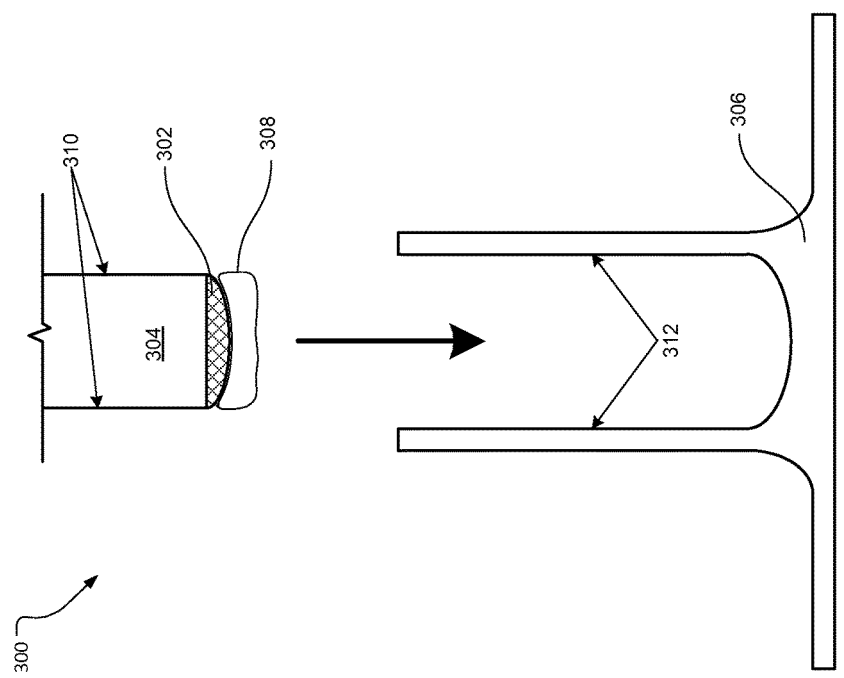
Figure 3C:
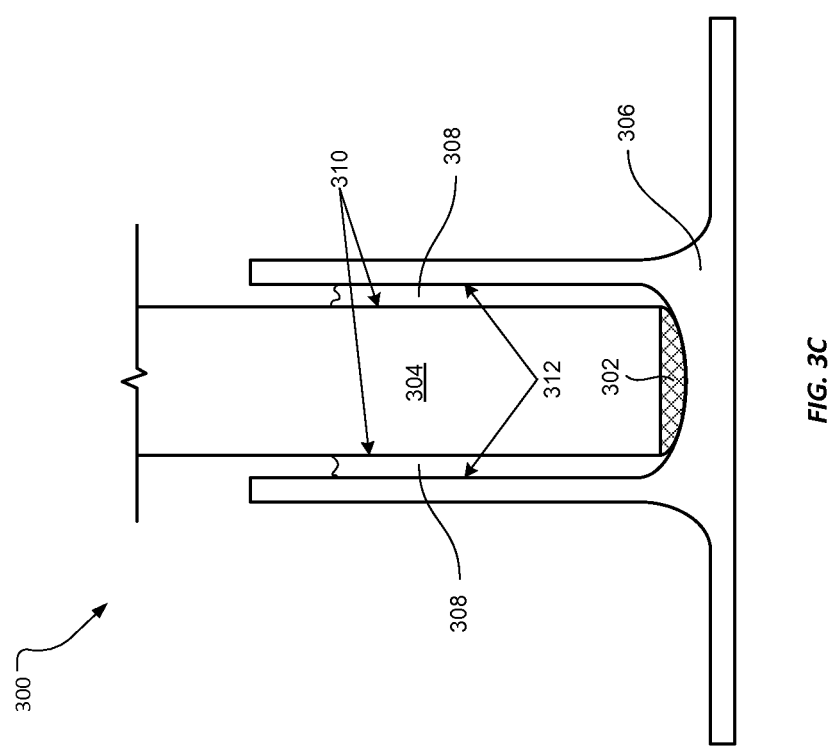

FIGS. 3A through 3C show an example adhesive application system 300 that includes an intermediate member 302 attached to an edge of a flange 304, a double lap joint element 306, and adhesive 308 between the intermediate member 302 and the double lap joint element 306. The flange 304 includes two rectangular surfaces separated by an edge having a thickness. The flange 304 can take many other forms. For example, the flange 304 can have a flat surface, circular surfaces, curved surfaces, other polygonal shaped surfaces, or other differently shaped surfaces or structures which may or may not match a contour of the double lap joint element 306. The flange 304 can have two sides 310, and the intermediate member 302 can attach to the edge of the flange 304 that makes contact with the adhesive 308 before other flange edges. The edge can be a lower edge of the flange 304, or another edge of the flange 304. The intermediate member can alternatively attach to a different portion of the flange 304, for example, one or both sides 310 of the flange 304. The flange 304 can be a portion of a wall panel, core board, composite laminate, floor panel, ceiling panel, and/or other rotorcraft component that connects to another rotorcraft component via the double lap joint element 306. The double lap joint element 306 is a support joint, connection joint, or other kind of double lap joint with a base structure and two support structures extending from the base structure having inner edges 312 that define a bond socket or reservoir, e.g., having a U-shape or C-shape. In some implementations, the double lap joint element 306 mounts to a rotorcraft component such as a beam of a fuselage frame structure, an exterior fuselage panel, an underside of floor panel, a cabin interior panel and/or another rotorcraft component. In certain implementations, the double lap joint element 306 may be unsupported by a skin adding stiffness to the integrated (bonded) flange 304, together forming a frame or longeron flange on one side while the flange 304 is bonded to another rotorcraft component with a double lap joint element on another side of the flange 304. The double lap joint element 306 can mount to a rotorcraft component with a fastener, adhesive, and/or other mounting element. The flange 304 with the intermediate member 302 is inserted (e.g., lowered) into the double lap joint element 306, and the adhesive 308 between the intermediate member 302 and the double lap joint element 306 flows in gaps between the sides 310 of the flange 304 and the inner edges 312 of the double lap joint element 306. The intermediate member 302 is non-permeable and prevents the adhesive 308 from flowing into the flange 304 through the lower edge of the flange 304 on which the intermediate member 302 mounts. The lower edge of the flange 304 can be open-edged, partially open-edged, closed-edged, or another configuration.

In some implementations, such as depicted in FIG. 3A, a predetermined volume of the adhesive 308 is applied to the intermediate member 302 before the flange 304 and intermediate member 302 are inserted into the double lap joint element 306. The predetermined volume of the adhesive 308 can include a quantity of adhesive sufficient to coat all or portions of the sides 310 of the flange 304. The adhesive 308 can include a variety of textures, for example, ranging from a viscous paste to a non-viscous liquid. In FIG. 3A, the adhesive 308 sticks to the intermediate member 302, for example, due to inherent viscous properties of the adhesive 308.

In some implementations, such as depicted in FIG. 3B, a predetermined volume of the adhesive 308 is applied to, e.g., poured into, the bottom surface of the double lap joint element 306 before the flange 304 and intermediate member 302 are inserted, e.g., lowered, into the double lap joint element 306. In some examples, adhesive 308 is applied to the intermediate member 302, the bottom surface of the double lap joint element, one or more sides 310 of the flange 304, one or more of the inner edges 312 of the double lap joint element 306, or a combination of these before the flange 304 with the intermediate member 302 is inserted into the double lap joint element 306.

The intermediate member 302 prevents the lower edge of the flange 304 from contacting the adhesive 308, and can take many forms. FIGS. 3A through 3C show the intermediate member 302 as including a curved protrusion connected to and extending from the lower edge of the flange 304. A shape of the surface of the intermediate member 302 can match (substantially or wholly) a shape of the bottom surface of the double lap joint element 306, for example, to force the adhesive up the sides of the flange 304 and the double lap joint element 306. In other implementations, the intermediate member includes additional or different features and components, as described below.

Although FIGS. 3A-3C show the flange 304 and the double lap joint element 306 oriented generally vertically, the flange 304 and double lap joint element 306 can be oriented differently, for example, horizontally or at a different angle. A mounting orientation of the flange 304 and double lap joint element 306 may be dependent on a respective rotorcraft component that the flange extends from or attaches to. For example, a fuselage wall panel may be oriented such that a respective flange and double lap joint element are oriented generally vertically, while a fuselage ceiling panel may be oriented such that a respective flange and double lap joint element are oriented generally horizontally. A fuselage wall panel may be oriented vertically such that a respective flange is moved upward into a double lap joint element, for example, such that adhesive can flow downward under gravity to fill gaps between the sides of the respective flange and the inner edges of the double lap joint element. The double lap joint element 306 can be oriented in any way, e.g., at an angle, and the adhesive 308 can be filled into the double lap joint element 306. In some implementations, the double lap joint element 306 can also be positioned for an advantageous assembly, where, for example, the rotorcraft is reoriented after assembly of the flange 304 in the double lap joint element 306.

FIGS. 4A-4D show another example adhesive application system 400 that is similar to the example adhesive application system 300 of FIGS. 3A-3C. In this example, the adhesive application system 400 includes a channel member 314, and the intermediate member 302 includes a contoured plunger 316. The channel member 314 has a profile that is similar (substantially or wholly) to a profile of the intermediate member 302 defined by the plunger 316. The channel member 314 is positioned at the bottom surface of the double lap joint element 306 and prevents adhesive 308 from contacting the bottom surface of the double lap joint element 306. In some implementations, the channel member 314 is suspended just below the intermediate member 302. The profiles of the channel member 314 and the contoured plunger 316 are shaped such that the channel member 314 and the contoured plunger 316 are adapted to bias adhesive 308 to flow in the gaps between the sides 310 of the flange 304 and the inner edges 312 of the double lap joint element 306. For example, the contoured plunger 316 of FIGS. 4A-4D includes two projections and the channel member 314 includes two recessions to match the projections of the contoured plunger 316. The recessions of the channel member 314 are configured to receive the projections of the contoured plunger 316 such that adhesive 308 between the channel member 314 and the intermediate member 302 is pressured into the gaps between the sides 310 of the flange 304 and the inner edges 312 of the double lap joint element 316 as the flange 304 with the intermediate member 302 is inserted into the double lap joint element 306. In some instances, the angled sides of the projections and recessions promote adhesive 308 to fill the gaps between the sides 310 of the flange 304 and the inner edges 312 of the double lap joint element 306.

In some implementations, the channel member 314 is permanently bonded to the bottom surface of the double lap joint element 306. In some implementations, the channel member 314 is removable from the bottom surface of the double lap joint element 306. A predetermined volume of the adhesive 308 can be applied on the channel member 314 after positioning the channel member 314 at the bottom of the double lap joint element 306. In some implementations, a predetermined volume of the adhesive 308 can be applied on the channel member 314 before positioning the channel member 314 at the bottom of the double lap joint element 306. For example, the channel member 314 can be filled with adhesive 308, then placed into the double lap joint element 306. In another example, the channel member 314 can be filled with adhesive 308, then temporarily suspended just below the intermediate member 302 with tape, an interference fit with the flange 304, adhesive, and/or other. The flange 304, intermediate member 302, and suspended channel member 314 can be inserted into the double lap joint element 306.

The profile of the channel member 314 allows for adhesive 308 to be applied to the channel member 314 and held in place (substantially or wholly) on the channel member 314 before the flange 304 with the intermediate member 302 is inserted into the double lap joint element 306 and the plunger 316 mates (substantially or wholly) with the channel member 314. For example, the recessions of the channel member 314 can act to hold adhesive 308 in addition to receiving the projections of the plunger 316. In other implementations, the plunger 316 and the channel member 314 can include different profiles, for example, with a different number of recessions and/or projections.

When inserting the flange 304 with the intermediate member 302 into the double lap joint element 306, some of the adhesive 308 may remain between the intermediate member 302 and the double lap joint element 306. In some implementations, such as depicted in FIG. 4D, a fastener 318 (e.g., threaded stud) through the double lap joint element 306 connects to the intermediate member 302 or both the intermediate member 302 and the flange 304 to force the flange 304 with the intermediate member 302 further into the double lap joint element 306. Forcing the flange 304 with the intermediate member 302 further into the double lap joint element 306 can force adhesive 308 out of an area between the intermediate member 302 and the channel member 314 and into the area between the sides 310 of the flange 304 and the inner edges 312 of the double lap joint element 306, can force the plunger 316 to move closer to and/or contact the channel member 314, and/or can assure proper positioning of the flange 304 in the double lap joint element 306, for example, by pressing the flange 304 against the double lap joint element 306 or pressing the double lap joint element 306 against the flange 304.

FIGS. 5A and 5B show another example adhesive application system 500 that is similar to the example adhesive application system 300 of FIGS. 3A-3C. In this example, the example adhesive application system 500 includes an intermediate member 502 with a tubular portion 320. FIG. 5C shows a perspective view of the tubular portion 320 of intermediate member 502 on the flange 304. The intermediate member 502 clamps to the lower edge of the flange 304 with ends that partially overlap onto the sides of the flange 304. In some implementations, the intermediate member 502 connects to the lower edge of the flange 304 without ends that partially overlap onto the sides of the flange 304. In other implementations, the tubular portion 320 connects directly to the lower edge of the flange 304. The tubular portion 320 extends a length of the flange 304 and/or the double lap joint element 306, or extends another length less than a full length of the flange 304 and/or the double lap joint element 306. In some implementations, the tubular portion 320 includes open longitudinal ends, for example, to apply adhesive in the tubular portion 320. In other implementations, the tubular portion 320 includes closed longitudinal ends with the predetermined volume of adhesive inside the tubular portion 320. The closed longitudinal ends can act to contain the adhesive in the tubular portion 320. In some implementations, the tubular portion 320 includes perforable positions disposed on a surface of the tubular portion 320. The perforable positions can include weak points in the material of the tubular portion 320, or perforations in the material of the tubular portion 320. For example, the perforable positions can blow out due to the weight of the intermediate member 502 and/or under force applied to insert, or lower, the intermediate member 502 into the double lap joint element 306. The perforable positions can be weak points in the material of the tubular portion 320 that can blow out, e.g., tear, upon application of force resulting in perforations. The tubular portion 320 holds a predetermined volume of adhesive. Inserting the flange 304 with the intermediate member 502 into the double lap joint element 306 causes the adhesive 308 in the tubular portion 320 to flow into the gaps between the sides 310 of the flange 304 and the inner edges 312 of the double lap joint element 306, as described below.

In some implementations, inserting the intermediate member 502 into the double lap joint element 306 causes a blowout of some or all of the perforable positions such that perforations formed on the surface of the tubular portion 320 of the intermediate member 502. The adhesive 308 flows through the perforations into the gaps between the sides 310 of the flange 304 and the inner edges 312 of the double lap joint element 306. In other implementations, the tubular portion 320 includes one or more perforations such that forcing the intermediate member 502 against the bottom surface of the double lap joint element 306 causes the adhesive 308 to flow through the perforations in the tubular portion 320 of the intermediate member 502 and into the gaps between the sides 310 of the flange 304 and the inner edges 312 of the double lap joint element 306. The perforations can allow adhesive 308 to flow through the perforations only when a certain amount of pressure is applied to the tubular portion 320. For example, due to a viscosity of the adhesive 308, the adhesive 308 in the tubular portion 320 does not flow through the perforations until the flange 304 with the intermediate member 502 is forced into the double lap joint element 306. The tubular portion 320 presses against the bottom surface of the double lap joint element 306, thus applying pressure on the tubular portion 320 as it is forced against the bottom surface of the double lap joint element 306. In certain instances, applying adhesive to the sides of a flange using a tubular portion allows for a metered amount of adhesive to be held in the tubular portion.

FIG. 6A shows the example adhesive application system 500 with a spacer 322 to reduce or eliminate excess adhesive at the bottom surface of the double lap joint element 306 as the flange 304 with intermediate member 502 is inserted into the double lap joint element 306. The spacer 322 spans a length of the double lap joint element 306 and covers the bottom surface of the double lap joint element 306. The spacer 322 has a generally flat surface with slight inclined ends at both inner edges 312 of the double lap joint element 306. Alternatively, the spacer 322 can take any of a variety of shapes to promote adhesive 308 to flow into the gaps between the sides 310 of the flange 304 and the inner edges 312 of the double lap joint element 306, other than the shape shown in FIG. 6A. Similarly in FIG. 6B, the example adhesive application system 300 includes a spacer 324 that matches (substantially or wholly) the profile of intermediate member 302 to reduce or eliminate excess adhesive at the bottom surface of the double lap joint element 306 as the flange 304 with the intermediate member 302 is inserted into the double lap joint element 306.

In some implementations after inserting the flange 304 with the intermediate member 302 or 502 into the double lap joint element 306, excess adhesive is removed from the sides of the flange. The adhesive 308 is allowed to cure, for example, at room temperature or at temperatures greater than room temperature.

Figure 7:
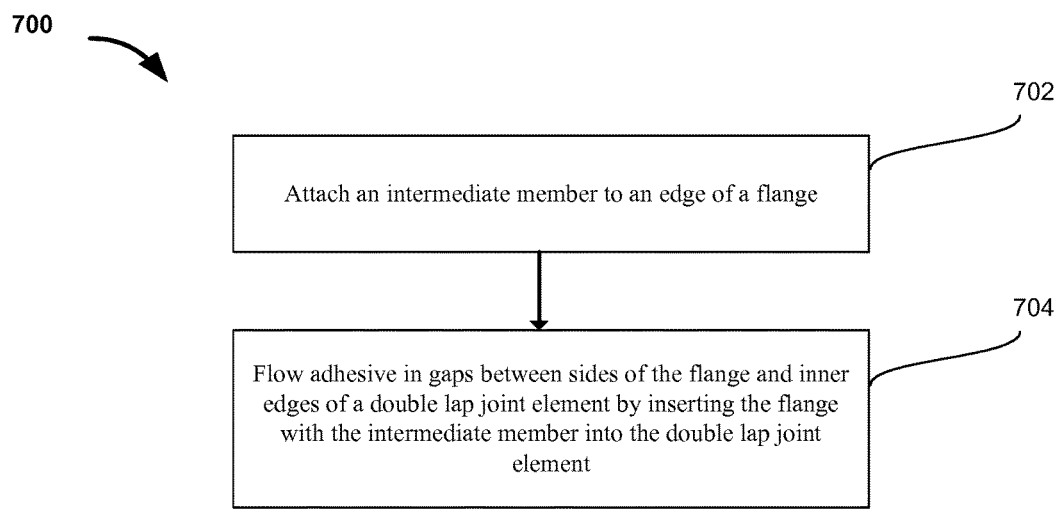
FIG. 7 is a flowchart describing a method for applying adhesive to sides of a flange.

FIG. 7 is a flow chart describing a method 700 for applying adhesive to sides of a flange, for example, performed by the example adhesive application system 300. At 702, an intermediate member is attached to an edge of a flange. At 704, adhesive flows in gaps between sides of the flange and inner edges of a double lap joint element by inserting the flange with the intermediate member into the double lap joint element.

FIG. 8 is a flow chart describing another method 800 for applying adhesive to sides of a flange, for example, performed by the example adhesive application system 400. At 802, an intermediate member is attached to an edge of a flange. At 804, a channel member is positioned between an intermediate member and a bottom surface of a double lap joint element. At 806, a predetermined volume of adhesive is applied on the channel member. The channel member prevents adhesive from contacting the bottom surface of the double lap joint element. In some instances, the predetermined volume of adhesive is applied on the channel member (step 806) before the channel member is positioned between the intermediate member and the bottom surface of the double lap joint element (step 804). At 808, the flange with the intermediate member is inserted into the channel member in the double lap joint element causing adhesive between the intermediate member and the double lap joint element to flow in gaps between sides of the flange and inner edges of the double lap joint element.

FIG. 9 is a flow chart describing another method 900 for applying adhesive to sides of a flange, for example, performed by the example adhesive application system 500. At 902, an intermediate member that includes a tubular portion is attached to an edge of a flange. At 904, a predetermined volume of adhesive is applied in the tubular portion of the intermediate member. In some instances, the predetermined volume of adhesive is applied to the tubular portion of the intermediate member (step 904) before the intermediate member is attached to the edge of the flange (step 902). At 906, the flange with the intermediate member is inserted into a double lap joint element causing adhesive in the tubular portion of the intermediate member to flow in gaps between sides of the flange and inner edges of the double lap joint element.

A number of implementations have been described. Nevertheless, it will be understood that various modifications may be made without departing from the spirit and scope of the disclosure.

What is claimed is:

1. A method for applying adhesive to sides of a flange, the method comprising:
   attaching an intermediate member to an edge of a flange, wherein the intermediate member prevents the edge of the flange from contacting the adhesive;
   flowing adhesive in gaps between sides of the flange and inner edges of a double lap joint element by inserting the flange with the non-permeable intermediate member into the double lap joint element; and
   tightening a fastener through the double lap joint element connected to the intermediate member to force the intermediate member closer to a bottom surface of the double lap joint element.

2. The method of claim 1, wherein the intermediate member is non-permeable.

3. The method of claim 1, wherein inserting the flange with the intermediate member into the double lap joint element comprises lowering the flange with the intermediate member into the double lap joint element; and
   wherein the edge of the flange is a lower edge of the flange.

4. The method of claim 1, further comprising positioning, at the bottom surface of the double lap joint element, a channel member having a profile that is substantially similar to a profile of the intermediate member.

5. The method of claim 4, wherein the channel member is permanently bonded to the bottom surface of the double lap joint element.

6. The method of claim 4, wherein the channel member is removable from the bottom of the double lap joint element.

7. The method of claim 4, further comprising applying a predetermined volume of the adhesive on the channel member after positioning the channel member at the bottom of the double lap joint element, wherein the channel member prevents the adhesive from contacting the bottom surface of the double lap joint element.

8. The method of claim 4, further comprising applying a predetermined volume of the adhesive on the channel member before positioning the channel member at the bottom of the double lap joint element, wherein the channel member prevents the adhesive from contacting the bottom surface of the double lap joint element.

9. The method of claim 4, wherein the intermediate member comprises a contoured plunger.

10. The method of claim 1, wherein the intermediate member includes a tubular portion, and wherein the method further comprises filling the tubular portion of the intermediate member with the adhesive.

11. The method of claim 10, further comprising causing perforations to be formed in a plurality of perforable positions on a surface of the tubular member of the intermediate member through which the adhesive flows into the gaps between the sides of the flange and the inner edges of the double lap joint element.

12. The method of claim 11, wherein causing perforations to be formed in a plurality of perforable positions on a surface of the tubular member comprises forcing the intermediate member against a bottom surface of the double lap joint element.

13. The method of claim 10, further comprising eliminating excess adhesive at a bottom surface of the double lap joint element using a spacer positioned at the bottom surface of the double lap joint element.

14. The method of claim 10, further comprising positioning, at a bottom surface of the double lap joint element, a channel member before inserting the intermediate member into the double lap joint element.

15. The method of claim 1, wherein the adhesive includes a predetermined volume of adhesive.

16. The method of claim 1, further comprising removing excess adhesive from the sides of the flange.

17. A method for applying adhesive to sides of a flange, the method comprising:
   attaching an intermediate member to an edge of a flange;
   positioning a channel member between the intermediate member and a bottom surface of a double lap joint element;
   applying a predetermined volume of adhesive on the channel member, wherein the channel member prevents the adhesive from contacting the bottom surface of the double lap joint element; and
   inserting the flange with the intermediate member into the channel member in the double lap joint element causing adhesive between the intermediate member and the double lap joint element to flow in gaps between sides of the flange and inner edges of the double lap joint element.

18. The method of claim 17, wherein positioning a channel member between the intermediate member and a bottom surface of a double lap joint element comprises positioning the channel member at the bottom surface of the double lap joint element.

19. The method of claim 18, wherein positioning the channel member at the bottom surface of the double lap joint element comprises positioning the channel member after applying a predetermined volume of adhesive on the channel member.

20. A method for applying adhesive to sides of a flange, the method comprising:
attaching an intermediate member that includes a tubular portion to an edge of a flange;
applying a predetermined volume of adhesive in the tubular portion of the intermediate member; and
inserting the flange with the intermediate member into a double lap joint element causing adhesive in the tubular portion of the intermediate member to flow in gaps between sides of the flange and inner edges of the double lap joint element.

21. The method of claim 20, further comprising forcing the intermediate member against a bottom surface of the double lap joint element to cause adhesive to flow through a plurality of perforations present in the tubular portion of the intermediate member and into the gaps between the sides of the flange and the inner edges of the double lap joint element.

\* \* \* \* \*